United States Patent Office 2,864,716
Patented Dec. 16, 1958

2,864,716
STABILIZED PASTE ROSIN SIZE

Alfred Chandler Schmalz, Wilmington, Del., assignor to Hercules Powder Company, Wilmington, Del., a corporation of Delaware No Drawing. Application July 26, 1957
Serial No. 674,278

6 Claims. (Cl. 106—238)

This invention relates to paste rosin sizes stabilized against crystallization.

It is well known that paste rosin sizes of constant total solids content and dilute emulsions prepared therefrom show, with increasing free rosin content, increasing tendency toward crystallization in storage. Also, sizes at constant acid number show, with increasing solids content, increasing tendency toward crystallization in storage. Thus, in the preparation of paper sizes from rosin, total solids and acid number must be controlled, i. e., not permitted to exceed certain maximum values depending on the type of rosin, in order to avoid crystallization. However, by so doing, one encounters another problem, namely, gelation of the size. The gelation problem can be avoided by raising the solids content and acid number, but this, unfortunately, sets the stage for crystallization.

It has now been discovered that crystallization is strikingly inhibited in paste rosin sizes by the inclusion therein of stabilizing amounts of various rosin amine derivatives having molecular weights of at least 327. Typical rosin amine derivatives which may be utilized herein are compounds of the general formula $$RN-CH_2CH_2Y$$
$$\ \ |$$
$$\ \ X$$

in which R represents the hydroabietyl or dehydroabietyl radicals, X represents hydrogen or a —$CH_2CH_2Y$ radical, and Y represents a nitrile, carboxyl, or a methyl amine radical which is the same in each instance.

Compounds of the above formula in which Y represents a cyano radical are produced by condensing a rosin amine of the formula $RNH_2$, in which R is a hydroabietyl or dehydroabietyl radical, with acrylonitrile. When the condensation is effected wtih one mole acrylonitrile, the product in which X is hydrogen is produced, and when the condensation is effected with more than one mole acrylonitrile, the product in which X is —$CH_2CH_2CN$ is produced.

The compounds of the general formula in which Y is a methyl amine group, —$CH_2NH_2$, are produced by hydrogenation of $RNHCH_2CH_2CN$ or $RN(CH_2CH_2CN)_2$ catalytically in the presence of free ammonia.

The products of the formula $RNHCH_2CH_2COOH$ and $RN(CH_2CH_2COOH)_2$ corresponding respectively to the compounds of the general formula in which X represents hydrogen and —$CH_2CH_2Y$, respectively, and Y represents —COOH in each instance are produced by alkaline hydrolysis of the corresponding nitriles, $RNHCH_2CH_2CN$ and $RN(CH_2CH_2CN)_2$.

Compounds of the above type together with methods of preparing them are fully set forth in U. S. Patent 2,686,776 to Gerald I. Keim.

Other rosin amine derivatives which may be utilized herein are (1) condensation products of rosin amine and alkylene dihalides, e. g. diabietyl ethylene diamine, the condensation product of abietyl amine and ethylene dichloride having the formula $RNHCH_2CH_2NHR$, where R is the same as above, (2) condensation products of rosin amine and organic acid anhydrides such as maleic anhydride, phthalic anhydride and so on to include (a) the half-amides formed by condensing one mole of the resin amine with one mole of the anhydride, e. g. the half-amide formed by condensing one mole of abietyl amine with one mole of maleic anhydride and having the following formula $RNHCOCHCHCO_2H$, where R is the same as above (b) the imides formed by heating the half-amides, and (c) the diamides formed by condensing two moles of rosin amine with one mole of the anhydride, e. g. the diamide formed by condensing two moles of abietyl amine with one mole of maleic anhydride and having the formula $RNHCOCHCHCONHR$, where R is the same as above; (3) reaction products of an organic acid anhydride, such as maleic anhydride, phthalic anhydride and the like with compounds which result from the reduction of condensation products of rosin amine and acrylonitrile, e. g. the reaction product of maleic anhydride and abietyl trimethylene diamine (product resulting from the reduction of the condensation product of abietyl amine and acrylonitrile) having the following formula $RNHCH_2CH_2CH_2NHCOCH_2CH_2COOH$, where R is the same as above; (4) N-alkyl condensation products of rosin amine and alkyl halides having at least 3 and preferably at least 6 carbon atoms such as propyl-, hexyl-, lauryl-, benzyl- and the like halides to include the resulting secondary and/or tertiary amines, e. g. the condensation product of abietyl amine with benzyl chloride to form a secondary amine having the formula $RNHCH_2C_6H_5$ and the condensation of this secondary amine with benzyl chloride to form a tertiary amine having the formula $RN(CH_2C_6H_5)_2$ where R in each case is the same as above; and (5) hydrolyzed condensation products of rosin amine and acrylonitrile having the formula

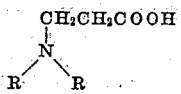

where R is the same as above. The above products and methods of preparing same are known to the art and need not be further described herein.

By stabilizing amount is meant a relatively small amount sufficient to prevent excessive crystallization in the paste rosin size during its storage under ordinary commercial conditions. Ordinarily, I find that from about 10% to about 20% of the rosin amine derivative, based on the weight of the rosin, is sufficient to prevent crystallization. My preferred range is from about 12% to about 16%.

The following examples are presented in illustration but not in limitation of the invention. All parts and percentages are by weight unless otherwise specified.

EXAMPLES 1–12

Paste sizes were prepared from rosin alone and rosin containing 15% by weight, based on the weight of rosin, of rosin amine and various rosin amine derivatives within the scope of the invention. The rosin utilized in preparing the sizes of Examples 1, 2, 4, 5 and 6 was a distilled tall oil rosin containing 88.6% resin acids and 4.0% fatty acids and having an acid number of 172 and a softening point (ring and ball) at 82.5° C. The rosin utilized in Examples 3 and 7–12 was a distilled wood rosin.

The sizes were cooked in the usual manner by melting the rosin, adding sufficient water and caustic to give the desired total solids and free rosin and stirring until a smooth paste was obtained. Samples of each size were seeded with resin size crystals and stored in an oven, in a closed container, at 60° C. The rate of crystallization was determined by examining the samples microscopically at weekly intervals. The results of these tests are shown in the following table.

Table

| Exam. No. | Crystal Inhibitor | Percent Free Resin | Crystallization (70% Total Solids) |
|---|---|---|---|
| 1 | None | 11 | Crystallized in 20 days. |
| 2 | do | 15 | Crystallized in 8 days. |
| 3 | Rosin amine | 15 | Crystallized in 14 days. |
| 4 | Diabietyl ethylene diamine. | 17 | No crystal growth in 45 days. |
| 5 | N,N-bis-abietyl-β-alanine. | 20 | Do. |
| 6 | 3-(abietyl amine) propyl-maleamic acid. | 16 | Do. |
| 7 | N-propyl rosin amine | 15 | Crystallized in 22 days. |
| 8 | N-hexyl rosin amine | 29 | Crystallized in 30 days. |
| 9 | N-lauryl rosin amine | 19 | No crystal growth in 49 days. |
| 10 | N-benzyl rosin amine | 19 | Do. |
| 11 | N-carboxyethyl hydrogenated amine. | 17 | No crystal growth in 45 days. |
| 12 | Bis(-3-cyanoethyl) rosin amine. | 20 | Slight crystal growth in 45 days. |

Examples 1 and 2 show that the higher the percent free rosin in the size, the more rapidly the size tends to crystallize. Example 3 shows that rosin amine is not a satisfactory crystal inhibitor. Examples 4 thru 12 show the high level of effectiveness of the rosin amine derivatives since each treated size has as great or greater free rosin content than the untreated controls.

In the preparation of the rosin size compositions in accordance with the invention, the rosin amine derivative may be added to the rosin and the blended rosin then converted into size, in the usual manner, as by heating with an alkali such as sodium carbonate, sodium hydroxide and so on. Alternatively, the rosin amine derivative may be added during preparation of the size.

The process of the invention is applicable to the stabilization of rosin size compositions prepared from any of the rosin materials conventionally used in the preparation of rosin sizes including gum rosin, wood rosin, tall oil rosin, specially refined and/or treated rosins, and so on. The process of the invention is also applicable to the stabilization of rosin size compositions containing adducts of rosin and materials such as maleic acid, maleic anhydride, fumaric acid, itaconic acid, citraconic acid and the like, and known in the art as fortified rosin sizes. As before, the rosin amine derivative may be added at any desired point before or during size formation.

The rosin amines utilized in preparing the rosin amine derivatives contemplated for use herein may be prepared as set forth in U. S. 2,686,776 referred to hereinabove. While ordinary gums, wood or tall oil rosin may be utilized, it is preferred to utilize a stabilized rosin as disclosed in the aforesaid patent.

The term "rosin amine" is utilized herein to include broadly the primary amines derived from rosins and rosin acids or stabilized rosins and stabilized rosin acids by conversion of the carboxyl group of the rosin or rosin acid to a —$CH_2NH_2$ group.

The term "abietyl amine" is used herein in a generic sense to include both hydroabietyl amine and dehydroabietyl amine. Moreover, these terms are referred to with the intention that they be considered broadly as covering rosin materials containing these compounds as major constituents.

What I claim and desire to protect by Letters Patent is:

1. A paste rosin size composition stabilized against crystallization by the incorporation therein of stabilizing amounts of a rosin amine derivative selected from the group consisting of (1) condensation products of rosin amine with acrylonitrile, (2) hydrogenated condensation products of rosin amine with acrylonitrile, (3) hydrolyzed condensation products of rosin amine with acrylonitrile, (4) condensation products of rosin amine with alkyl halides having at least 3 carbon atoms, (5) condensation products of rosin amine with lower alkylene dihalides, and (6) reaction products of maleic anhydride with compounds obtained by the reduction of condensation products of rosin amine with acrylonitrile, said rosin amine derivative having a molecular weight of at least 327.

2. A paste rosin size composition as set forth in claim 1 in which the rosin amine derivative is a condensation product of rosin amine with acrylonitrile.

3. A paste rosin size composition as set forth in claim 1 in which the rosin amine derivative is a hydrolyzed condensation product of rosin amine with acrylonitrile.

4. A paste rosin size composition as set forth in claim 1 in which the rosin amine derivative is a condensation product of rosin amine with alkyl halides having at least 3 carbon atoms.

5. A paste rosin size composition as set forth in claim 1 in which the rosin amine derivative is a condensation product of rosin amine with lower alkylene dihalide.

6. A paste rosin size composition as set forth in claim 1 in which the rosin amine derivative is a reaction product of maleic anhydride with compounds obtained by the reduction of condensation products of rosin amine with acrylonitrile.

References Cited in the file of this patent

UNITED STATES PATENTS

| 2,343,091 | Smith | Feb. 29, 1944 |
| 2,438,096 | Poor et al. | Mar. 16, 1948 |
| 2,584,123 | Gruenwald | Feb. 5, 1952 |
| 2,614,997 | Robinson et al. | Oct. 21, 1952 |